United States Patent [19]

Johnson

[11] Patent Number: 4,477,207
[45] Date of Patent: Oct. 16, 1984

[54] MARINE RISER BUOYANCY ASSEMBLY

[76] Inventor: Arne I. Johnson, 7400 34th St. South, Apt. 125, St. Petersburg, Fla. 33711

[21] Appl. No.: 411,781

[22] Filed: Aug. 26, 1982

[51] Int. Cl.³ .............................................. E21B 17/01
[52] U.S. Cl. .................................... 405/195; 166/350; 166/359
[58] Field of Search ............................... 405/195–208, 405/224; 114/264, 265; 441/133; 166/350, 359, 367

[56] References Cited

U.S. PATENT DOCUMENTS

| | | |
|---|---|---|
| 3,705,432 | 12/1972 | Watkins . |
| 3,729,756 | 5/1973 | Cook et al. .................. 166/350 X |
| 4,047,579 | 9/1977 | Wilckens et al. ............ 166/350 X |
| 4,128,921 | 12/1978 | Heinze . |
| 4,176,986 | 12/1979 | Taft et al. ................... 166/350 X |
| 4,249,610 | 2/1981 | Loland ....................... 166/359 X |

Primary Examiner—Dennis L. Taylor
Attorney, Agent, or Firm—Dowell & Dowell

[57] ABSTRACT

A buoyancy assembly for mounting on a pipe such as a marine riser having service lines, such as choke and kill lines extending therealong, the assembly including discontinuous clamping band members shaped to encompass the pipe and having brackets disposed to join the ends of the band members and tighten their grip on the pipe when bolts joining the band members to the brackets are tightened, the brackets having opposed walls extending outwardly therefrom and supporting cradles to receive and clamp the service lines, and the assembly including arcuate flotation modules of syntactic foam shaped to lie against the riser pipe and removably occupy the spaces between the service lines and form a generally cylindrical outer contour, the modules being held in place against the pipe by tensioning belts each comprising a strap anchored to the adjacent brackets and being tensioned by a tension bar gripping an end of a strap and bolted by tensioning bolts to a link which is pivotally connected to the adjacent bracket. Multiple service line supporting cradles are spaced around the circumference of the clamping bands at positions opposite each service line.

11 Claims, 10 Drawing Figures

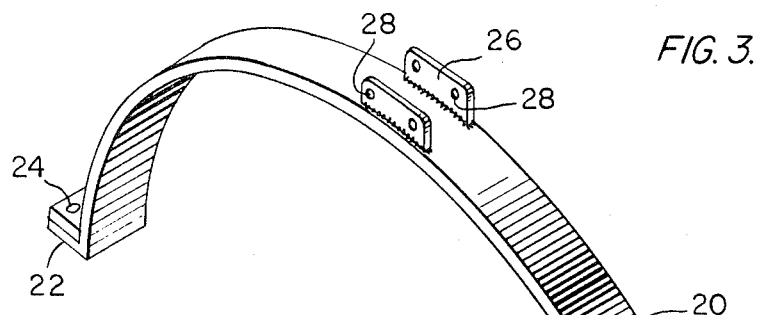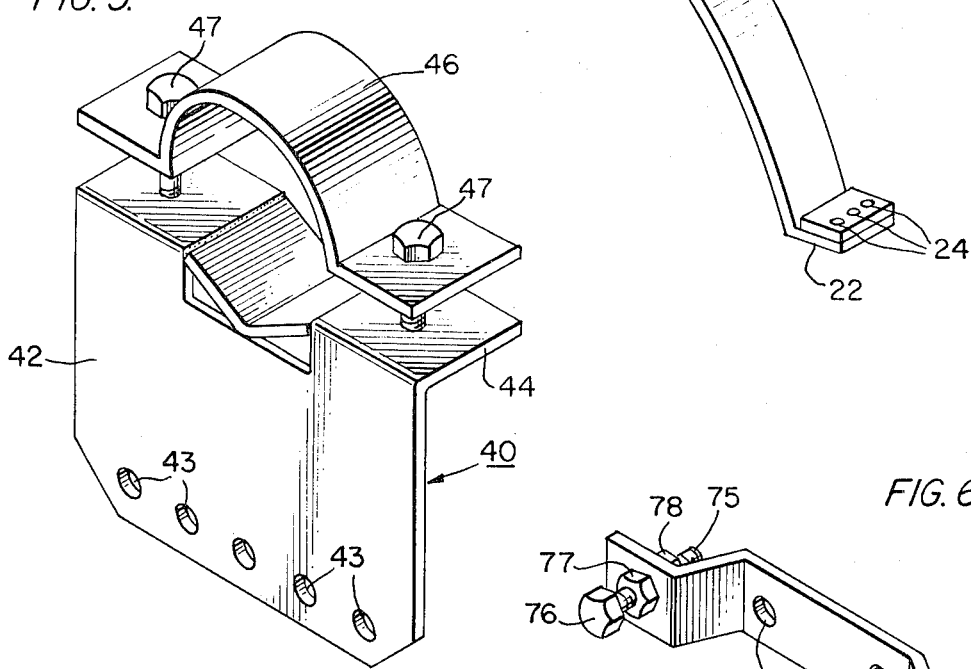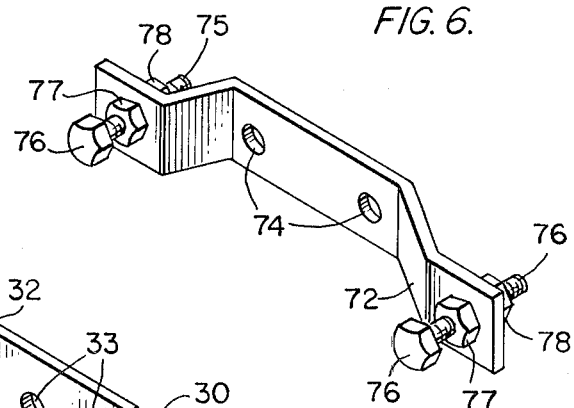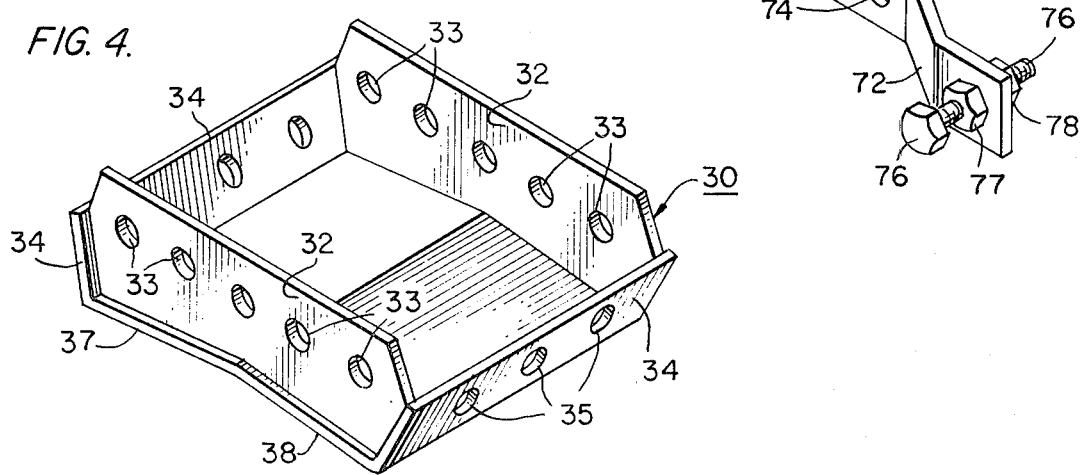

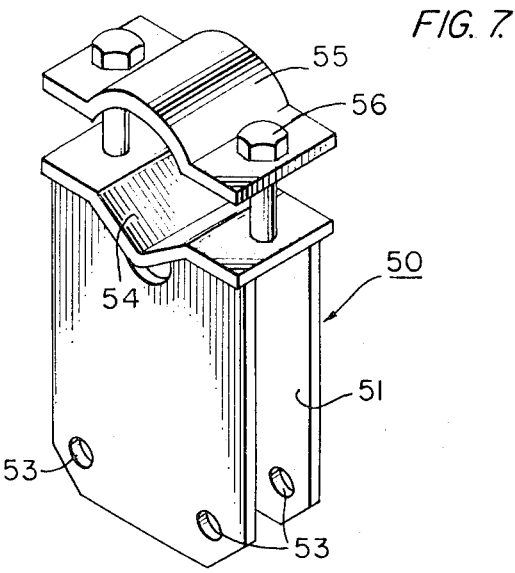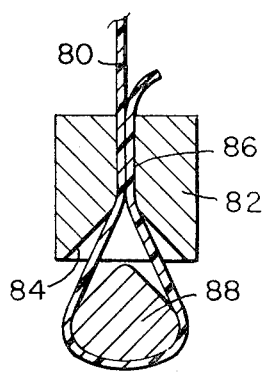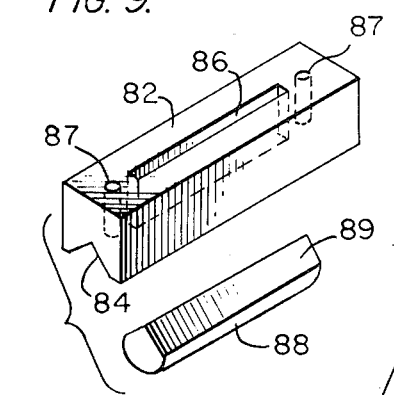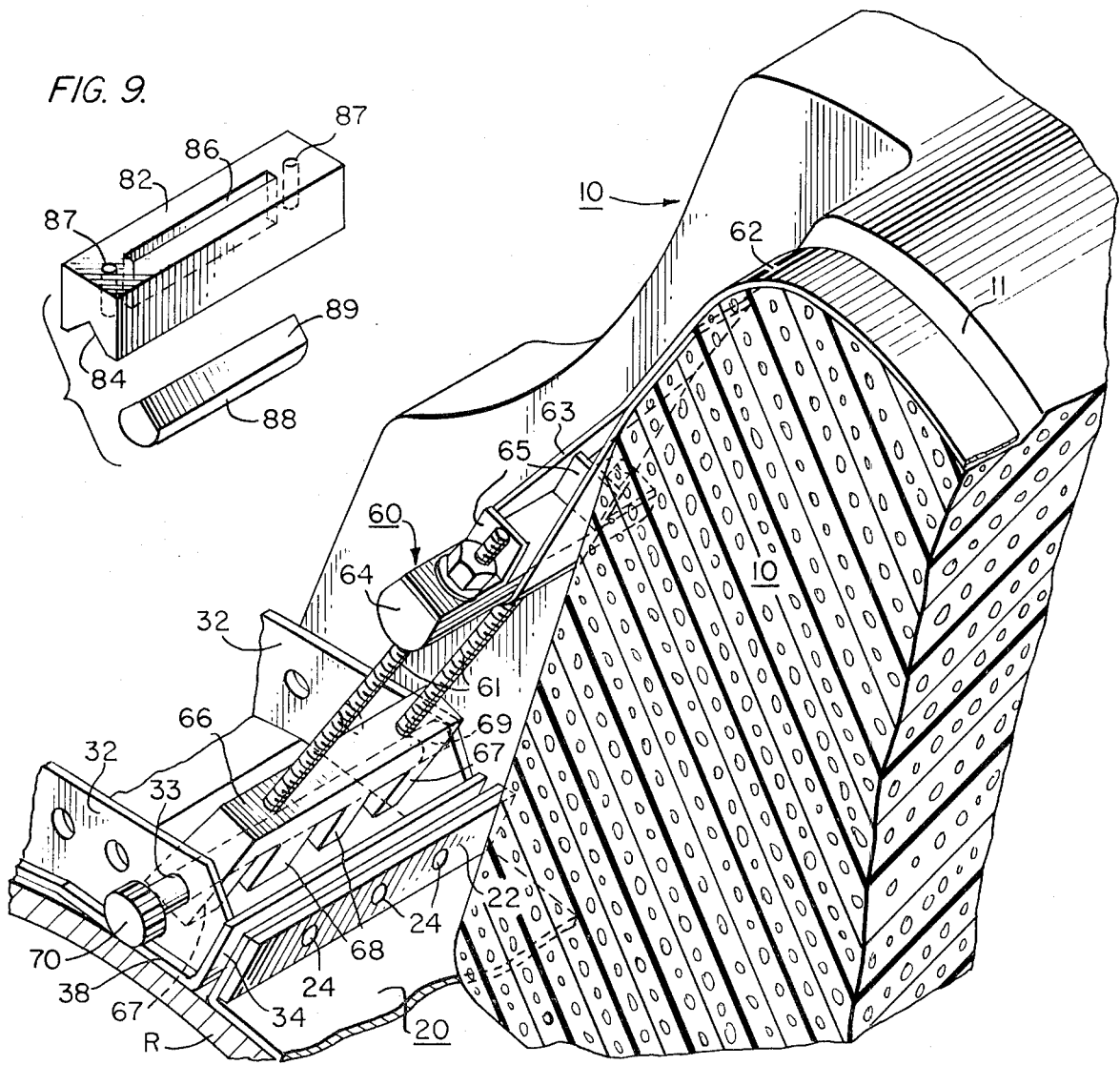

MARINE RISER BUOYANCY ASSEMBLY

BACKGROUND AND PRIOR ART

This invention relates to buoyancy assemblies for attachment to a marine riser of the type used in offshore drilling operations and extending between the drilling vessel and the wellhead on the ocean floor. It is well known in the art that a riser pipe that is tensioned upwardly tends to remain more nearly vertical and many drilling vessels include means for applying upward tensioning forces to the upper end of the riser. It is also common practice to apply buoyancy modules to the outside of the riser pipe to counteract its weight when submerged.

These techniques are generally discussed in "Deepwater Floating Drilling Operations" (1979), by L. M. Harris, The Petroleum Publishing Company, Tulsa, Okla., see Chapter 13 beginning on page 169. The prior patented art includes various buoyancy assemblies, such as disclosed in U.S. Pat. No. 3,705,432 to Watkins, and in U.S. Pat. No. 3,729,756 to Cook et al., both of which show semiannular flotation modules that are clamped together to substantially surround a riser pipe, providing support also for choke and kill lines. The parts of these modules are moulded together, however, making it impossible to replace damaged buoyant foam members per se while leaving the clamping and line supporting structures still attached to the riser pipe.

The prior art also shows strap tensioners comprising metal tension bars passed through loops in the strap and tensioned by adjustable bolt means, as disclosed in U.S. Pat. No. 4,128,921 to Heinze.

SUMMARY OF THE INVENTION

The invention comprises a buoyancy assembly for mounting on a marine riser pipe having service lines extending therealong. The assembly includes removable discontinuous clamping bands encompassing the riser pipe and having free ends joined together by brackets inserted therebetween to which flanges on the ends of the band are bolted. There can be more than one bracket inserted in a band where the band is divided into more than one band member. The brackets have opposed walls extending outwardly from the riser and including two opposed walls extending substantially longitudinally of the axis of the riser which are bolted to the adjacent end flanges of the band members, and further including opposed walls extending substantially transversely of the axis of the riser which support cradles to which the adjacent service lines are clamped. The assembly further includes plural arcuate buoyancy modules of syntactic foam, or other flotation means, which modules lie against the riser, occupying the space between the service lines and forming a generally cylindrical outer contour. The modules are held in place against the riser by belts which comprise straps having looped ends passing through tension bars. The bars in turn are coupled by tensioning bolts to links which are pivotally mounted to the adjacent brackets near the surface of the riser, the straps being tensioned by said bolts passing through the bars and links and serving to pull the latter toward the former when the bolts are tightened. Additional cradle members to support other service lines can be mounted to lugs fixed to the outer surface of the bands. Thrust stops attached to the brackets are disposed to abut the modules to prevent axial shifting thereof in the assembly.

OBJECTS AND ADVANTAGES OF THE INVENTION

It is the object of this invention to provide an improved marine riser buoyancy assembly of the type which serves both to support riser service lines and to secure buoyant flotation modules against the riser located between the service lines, the present invention providing mounting hardware which is separate from the buoyant modules themselves and which is configured so that the hardware can remain undisturbed, supporting the service lines on the riser, while the buoyant modules are being selectively removed for servicing or replacement.

It is another object of the invention to provide an assembly which is lighter and more economical to manufacture than prior art assemblies, particularly those where the flotation modules are moulded integrally with the service line supporting parts of the assembly.

Another object of the invention is to provide an assembly which is useful to efficiently mount and support service lines on a riser, with or without buoyancy modules, or which is useful to add one or more service lines to an existing riser installation, the hardware according to the present invention being quickly and easily installed on a riser using only ordinary hand tools and being so light that it is easily held in place on the riser by workmen while tightening the tensioning bolts.

A further object of the invention is to provide an assembly which is useful to efficiently mount and support buoyancy modules on a pipe having no service lines extending therealong, or to support modules on a riser having service lines without itself supporting the installed service lines. In the latter case the assembly can be mounted without interfering with existing service line clamps.

Still another object of the invention is to provide an assembly having thrust stop members carried by the hardware in positions that will abut the flotation modules to provide thrust reaction which will maintain the modules against axial shifting thereof during operation or handling of the risers. This feature eliminates the need for large stop collars that are usually installed above and below buoyant modules to prevent lengthwise shifting thereof along a supporting riser.

A further object of the invention is to provide an assembly which has a number of tensioning bolt locations in each encircling band so that enough adjustment is provided to permit the band to be properly tensioned on the riser to accommodate tolerances to a greater extent than known prior art assemblies. Shimming of the bands can also be used in cases where the diameter of the riser is considerably undersize.

Another object of the invention is to provide an assembly in which all hardware components are recessed within the outer contour of the buoyancy modules where they are out of the way and protected during running of the riser. Nevertheless it is still possible to remove and install service lines without disturbing the installed buoyant modules.

Yet another object of the invention is to provide an assembly which has a belt system for holding the modules in place that can employ straps of any suitable material, and can attach the ends of the straps either directly to the supporting tension bars or can provide loops in the ends of the straps to receive the tension bars.

Other objects and advantages of the invention will become apparent during the following discussion of the drawings.

THE DRAWINGS

FIG. 3 is a perspective view of a strap member forming part of a clamp for surrounding the riser;

FIG. 4 is a perspective view on a larger scale showing a bracket of the type used to join the ends of the strap members;

FIG. 5 is a perspective view of a cradle suitable for attachment to a bracket to support a riser service line;

FIG. 6 is a perspective view of thrust stop member to be supported by a bracket to contact a flotation module and prevent axial shifting thereof on the riser;

FIG. 7 is a perspective view of a different cradle member suitable for bolting to the lugs shown in the middle of the band member shown in FIG. 3;

FIG. 8 is a perspective view showing a flotation module secured in place on a riser by the strap of a belt system which is tensioned by a tension bar secured to a link by tensioning bolts, the link being attached by a pin to an adjacent bracket;

FIG. 9 is an exploded perspective view showing a modified form of tension bar assembly for gripping a strap having no loops in its ends; and FIG. 10 is a sectional view through a bar assembly of the type shown in FIG. 9, and showing a non-looped strap extending therethrough.

PREFERRED EMBODIMENT

Figure 1:
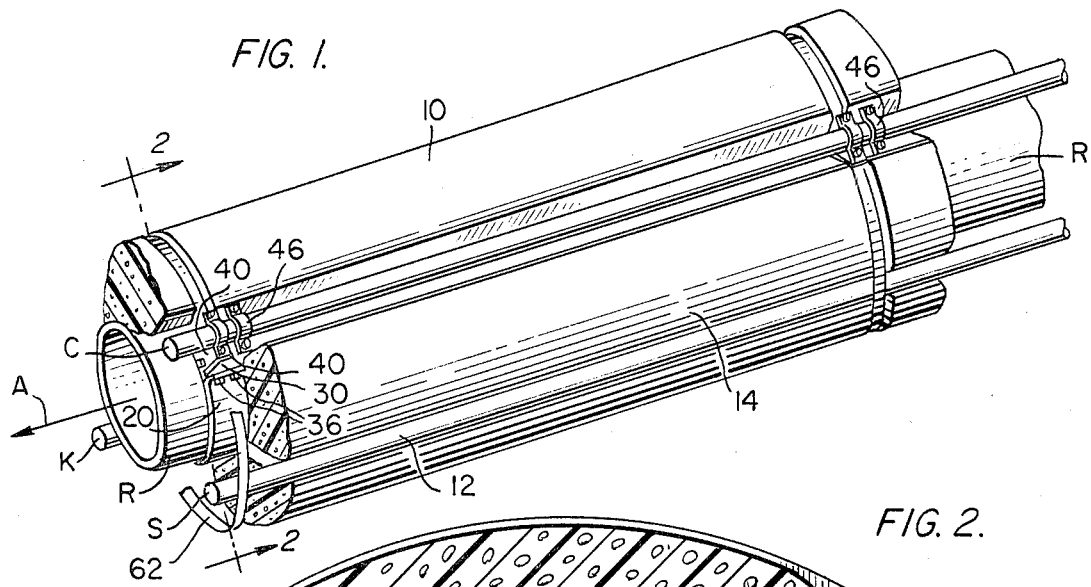
FIG. 1 is a perspective view of a riser having service lines and having a buoyancy assembly according to the present invention installed thereon, parts of the view being broken away to show details.

Referring now to the drawings, FIG. 1 shows in perspective a view of a riser R supporting a buoyancy assembly according to the present invention. There are two main service lines which include a choke line C and a kill line K, and for illustrative purposes one additional service line S is also shown spaced between the lines C and K.

The buoyancy assembly includes three buoyancy modules including for illustrative purposes a substantially semiannular syntactic foam module 10 which encompasses almost half of the diameter of the riser, and two smaller modules 12 and 14 which encompass only about one quarter of the diameter of the riser, the modules respectively occupying the space between the three service lines C, K and S.

The buoyancy assembly further includes a clamp assembly which includes discontinuous clamping band means comprising in this embodiment two band members 20, FIG. 3, the band members each extending a little less than half way around the riser R and having radially extending bolting flanges 22 at their opposed ends. Each flange 22 has a pattern of bolt holes 24, and the illustrated band member has a pair of spaced lugs 26 with bolt holes 28 extending therethrough, these parts being used for the purposes hereinafter explained.

Figure 2:
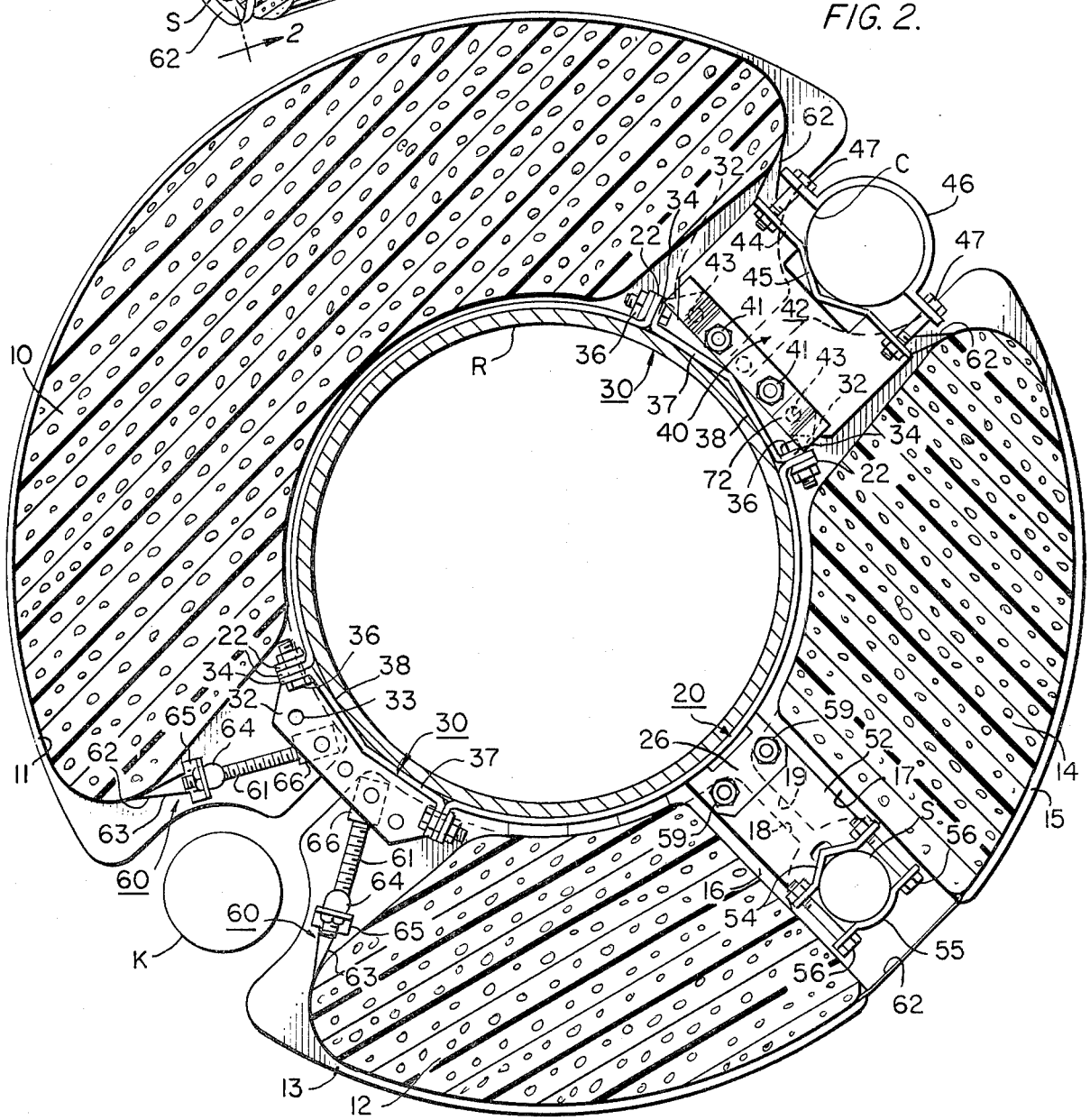
FIG. 2 is an enlarged cross section view taken along line 2—2 of FIG. 1.

FIG. 4 shows a bracket 30 of the type which is attached to the ends of two adjacent band members 20 and used to couple them together and tighten the band members on the riser R, two being required in the illustrative embodiment as shown in FIG. 2. Each bracket 30 comprises two parallel opposed transverse walls 32 which when mounted extend outwardly from the surface of the band member 20 and lie in a plane normal to the axis A of the clamping band and riser R, the transverse walls 32 having a pattern of holes 33 therethrough. The bracket further comprises two other opposed walls 34 which, when mounted, extend longitudinally of the riser in substantially radial planes and have a pattern of holes 35 which match the pattern of the holes 24 in the flanges 22 of the band members 20 so that they can be joined by tightening bolts 36 as shown in FIGS. 1 and 2. The brackets 30 further include angled bottom plates 37 and 38 which lie against the riser R when the assembly is installed and approximately follow the coutour of the riser surface. As stated above, the opposed walls 34 are bolted to the flanges 22 of the band members. The other set of opposed walls 32 are used to support service line cradles 40 of the type shown in FIG. 5.

When the service lines are to be partially or fully supported by the assembly according to the present invention, they are clamped in place by cradles 40 of the type shown in FIGS. 1, 2 and 5. Each such cradle 40 includes an outwardly extending plate 42 having a pattern of holes 43 at its inner end to receive bolts which pass through holes 33 in the bracket and support the plate 42 against a wall 32 of the bracket, with the plate located outside of the wall 32. The outer end of the plate 42 is bent at right angles to form a platform 44 in the center of which is a recessed service line receiving plate 45. A U-shaped clamping bar 46 overlies the platform 44 and is secured thereto by bolts 47, one of the service lines being held against the plate 45 by the clamping bar 46 as can be seen in FIGS. 1 and 2. As can also be seen in FIG. 1, two cradles 40 can be used at each bracket 30 in the present embodiment, one bolted to each of the transverse walls 32. However one of these cradles 40 can be omitted in cases where the service line does not require such strong support, i.e. where it may already be supported by other members carried by the riser to which the present assembly is being added.

In addition to the cradles 40 that attach to the brackets 30, other cradle members can be mounted at locations around the band members 20 different from locations at the brackets 30. Another type of cradle member 50 is shown in FIG. 7, and comprises two outwardly extending parallel standoff members 51 and 52 having holes 53 in their inner ends which match the holes 28 in the lugs 26, FIG. 3, so that they can be mounted thereon as shown in FIG. 2. The standoff members support a saddle plate 54 for receiving another service line, such as the service line S shown in FIG. 1. As described in connection with FIG. 5, the service line is held against the saddle plate by a convex clamping bar 55 having holes aligning with holes in the saddle plate 54 through which bolts 56 are tightened.

FIG. 2 is an enlarged cross section taken along line 2—2 of FIG. 1. This view shows band means comprising two band members 20 joined at their end flanges 22 to two interposed brackets 30 by tightening bolts 36 which tighten the resulting band means on the outer surface of the riser R. Shims can be used between the band means and the riser if necessary to achieve adequate tightening of the former on the latter. At the upper end of FIG. 2 the choke line C is held in place by one or more cradles 40, each cradle having its plate 42 secured to a transverse wall 32 by bolts 41 passing through the holes 43 in the plate and 33 in the bracket wall, the cradle plate 42 extending outwardly from the riser pipe and lying in a plane normal to its axis A. The choke line C is clamped to the plate 45 by the U-shaped bar 46 and the bolts 47. Note that this securing means is completely removable without disturbing the flotation modules 10 and 14. The other side of the assembly in the vicinity of the kill line K will be identical to the cradle member shown for the choke line C, but the cradle 40 has been omitted so that the belt means tensioning system can be seen. This system is also seen in FIG. 8.

Referring now to FIGS. 2 and 8, it will be seen that the flotation modules 10, 12 and 14 have grooves around their outer surfaces which are respectively labeled 11, 13 and 15, these grooves receiving the straps 62 of the belt means 60 which hold the flotation modules against the riser R. Each end of each illustrated strap 62 has a loop 63 which passes around a semicircular tension bar 64 having two angle members 65 attached thereto to center the loop 63 of the strap. The tension bar 64 is in turn attached to a link 66 by two tensioning bolts 61 which pass respectively through the bar 64 and link 66 and pull the straps 62 tightly around the flotation modules by pulling the looped ends 63 and the tension bars 64 toward the links 66. Each link 66 has four bosses, FIG. 8, which extend away from the tension bar 64, the outer bosses being labeled 67 and the inner bosses being labeled 68. The heads of the two tensioning bolts 61 are respectively nonrotatively held between an inner boss 68 and an outer boss 67 so that they can not turn when the nuts are being tightened against the tension bar 64 to tension the straps 62. The four bosses 67 and 68 of the link 66 are drilled at 69 to receive a mounting pin 70 which pivotally mounts the link to the transverse walls 32 of the bracket 30 at aligned holes 33.

To the right in FIG. 2 between the two smaller flotation modules 12 and 14, are located the two lugs 26 that are welded to the band member 20 as shown in FIG. 3. These lugs support the cradle member 50 shown in FIG. 7, which is bolted to lugs 26 by bolts 59 passing through the pattern of holes 28 and 52 which mutually align when the plate members 51 and 52 are set between the lugs 26. When so mounted, the cradle member 50 receives the line S in the saddle plate 54, the line S being clamped therein by the clamping bar 55 and the bolts 56. The adjacent ends of the flotation modules are provided with recesses 16 and 17 in their adjacent contours 18 and 19 to provide clearance for the cradle means 50, but the strap 62 passes continuously between the modules 12 and 14.

FIG. 6 shows a thrust stop member comprising a strip 72 having holes 74 in its central portion for mounting using the same holes and bolts that mount the outwardly extending plates 42 of the cradles 40 on the walls 32 of the brackets 30. The thrust stop members are therefore secured in position transversely of the riser R at the faces of the plates 42 as shown in FIG. 2 so that they can bear against the ends of the foam modules and prevent them from shifting longitudinally of the riser R. Notice that the stop member can be provided with adjustment bolts 75, FIG. 6, whose heads 76 extend from the stop member toward the module 10, the bolts being adjustably secured to the stop member by double nuts 77 and 78 so that the bolt can be locked in a desired position with the head just touching the adjacent foam module 10 to thereby adjust the abutment against the modules for tolerances in their dimensions. There are of course other ways of adjusting for tolerances, for instance by using stop members which are differently bent to accomodate greater or lesser spacings between the modules 10 and the adjacent brackets 30.

FIGS. 9 and 10 show views of an alternative form of tension bar assembly which differs from the tension bar 64 assembly which is used as shown in FIG. 8 to secure the looped ends 63 of straps 62. The structure shown in FIGS. 9 and 10 secures the end of a non-looped strap 80, which can be made of reinforced plastic and pulled from rolls. A good type of material for this purpose is Dupont KEVLAR ® which is sufficiently dimensionally stable for present purposes, although the concept is not to be limited to plastic strapping. The alternate assembly comprises a bar 82 which has a downwardly opening wedge-shaped lower surface 84 intersected by a wide slot 86 for receiving the strap 80, and also intersected by two bolt holes 87 for receiving tensioning bolts 61 as shown in FIG. 8. A wedge member 88 having a wedge shaped upper surface 89 mates with the wedge shaped surfaces 84 and jams the strap 80 therebetween to lock its end as can be seen in FIG. 10. The wedge member 88 is about as long as the space between the tensioning bolts 61 so that when completely assembled the bolts 61 prevent the wedge member 88 from sliding endwise out of the encompassing strap 80. It is preferred that the angle members 65 be used when the assembly 80, 82 and 88 is substituted for the tension bar 64 and looped strap 62, because the angle members tend to protect the strap 80 between them from damage during careless handling of wrenches used to tighten the tension bolts 61 during installation.

This invention is not to be limited to the illustrative embodiment shown and described, because changes can be made within the scope of the following claims:

I claim:

1. A buoyancy assembly for mounting on a riser pipe having service lines extending therealong, the assembly comprising:
   (a) discontinuous clamping band means shaped to extend around the riser pipe normal to its axis and having opposed ends and having tightening means for securing said opposed ends to tighten the clamping band means on the pipe;
   (b) bracket means attached to the band means opposite at least one service line, and each bracket means having walls extending outwardly from the band means including two opposed transverse walls extending in a plane normal to said axis;
   (c) service line supporting means carried by at least one of said transverse walls of the bracket means and each including a supporting cradle and a clamping bar, and including securing means to tighten the bar toward the cradle;
   (d) arcuate flotation modules shaped to lie against the riser pipe between the service lines, and having outer surfaces forming a contour surrounding the riser pipe; and
   (e) belt means for securing the modules in the assembly, and comprising a strap overlying each module and the strap having a tension bar at each end; a link pivoted to each bracket means; and tensioning bolt means extending between the tension bars and the links and operative when tightened to tension the strap overlying the adjacent module.

2. The assembly as claimed in claim 1, wherein each bracket means has four outwardly extending walls including two opposed longitudinal walls lying in substantially radial planes, the discontinuous band means including multiple arcuate band members having at each end a radially extending flange, each flange lying adjacent to one of said opposed longitudinal walls, and said tightening means comprising bolt means transfixing said flanges and adjacent longitudinal walls.

3. The assembly as claimed in claim 2, wherein there are two bracket means bolted between two band members and lying on diametrically opposite sides of the riser pipe, and wherein at least one band member has fixed thereto intermediate its ends a cradle member for a service line, the cradle member including a saddle and a clamping bar and securing means for tightening the bar toward the saddle.

4. The assembly as claimed in claim 3, wherein said cradle member includes two opposed transverse lugs secured to the outer surface of the band member intermediate its ends, and the cradle member further includes a standoff member supporting the saddle and clamping bar and securing means, the standoff member being bolted to the lugs.

5. The assembly as claimed in claim 1, wherein said service line supporting means comprises supported on a transverse wall of a bracket means a service line cradle and associated clamping bar and clamping bar securing means.

6. The assembly as claimed in claim 1, further including a thrust stop member secured to the transverse wall of a bracket means and having a portion disposed to abut the adjacent flotation module to prevent shifting thereof axially of the riser pipe.

7. The assembly as claimed in claim 6, wherein said portion disposed to abut the adjacent module comprises screw means extending from the stop member toward the module, and means to adjust the degree of extension of the screw means from the stop member.

8. The assembly as claimed in claim 1, wherein each link of a belt means comprises a rod having spaced bosses extending from one side thereof, the bosses extending between the transverse walls of a bracket means and being pivotally secured thereto by a pin transfixing the transverse walls and the bosses, and each tension bar lying parallel to a link and having a rounded surface around which the end of a strap passes and is secured, and the tensioning bolt means extending between the tension bar and the rod of the adjacent link and being operative when tightened to tension the bar and strap toward the link.

9. The assembly as claimed in claim 8, wherein each tensioning bolt means comprises a headed bolt passing through a link and a tension bar, the heads of the bolts being held between adjacent bosses of the link; and nut means on the bolts on the opposite side of the tension bar from the link.

10. The assembly as claimed in claim 8, wherein each tension bar comprises a bar having a wedge-shaped recess along one surface; a complementarily shaped wedge member receivable in said recess, and the bar having a slot extending through the bar and intersecting the wedge shaped recess, whereby a strap passing through the slot and around the wedge member and back again through the slot is locked to the bar when the wedge member is pulled into the recess by tensioning the strap.

11. The assembly as claimed in claim 1, wherein each flotation module has a groove in its outer surface shaped to receive the strap of the belt means and guide it between its ends, each end portion of a module being recessed away from the adjacent bracket means to provide access to the tension bar, link and tensioning bolt means.

* * * * *